Figure 1:
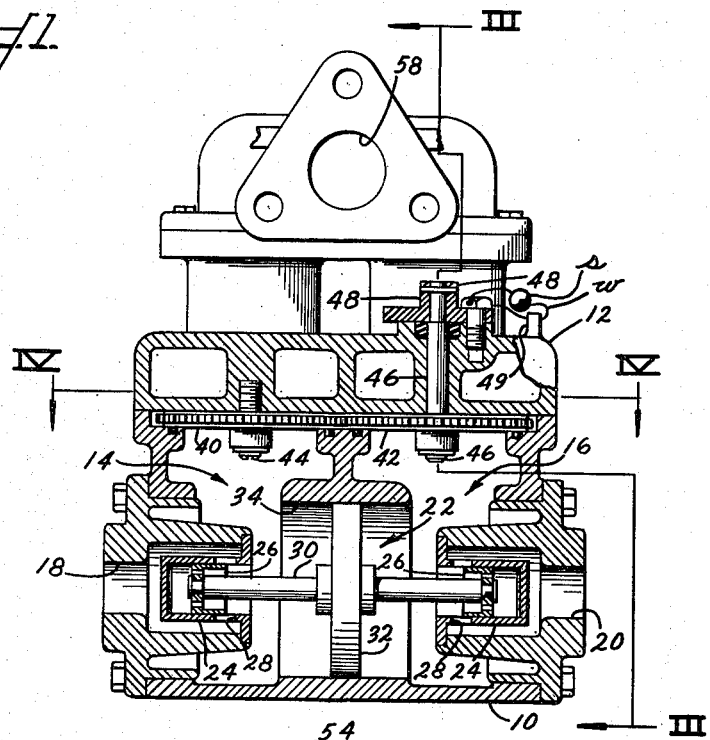

May 11, 1965

G. G. THIEM 3,182,677

MIXING VALVE

Filed Oct. 5, 1962

4 Sheets-Sheet 1

INVENTOR.
Gerhard G. Thiem
BY Chapin & Neal
Attorneys

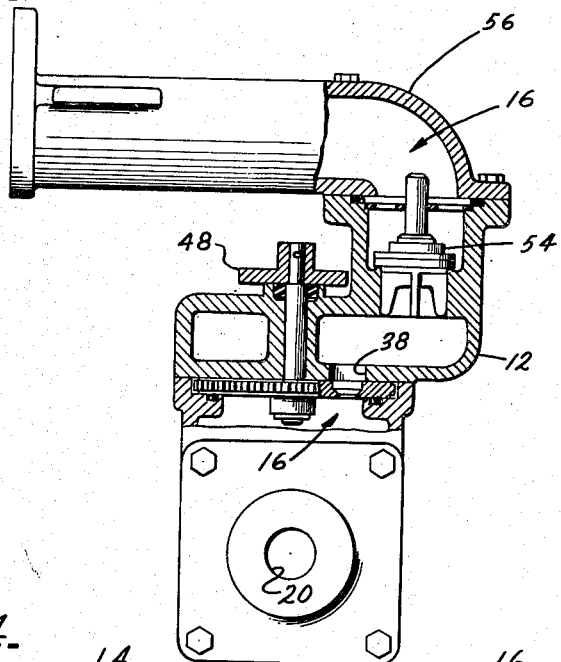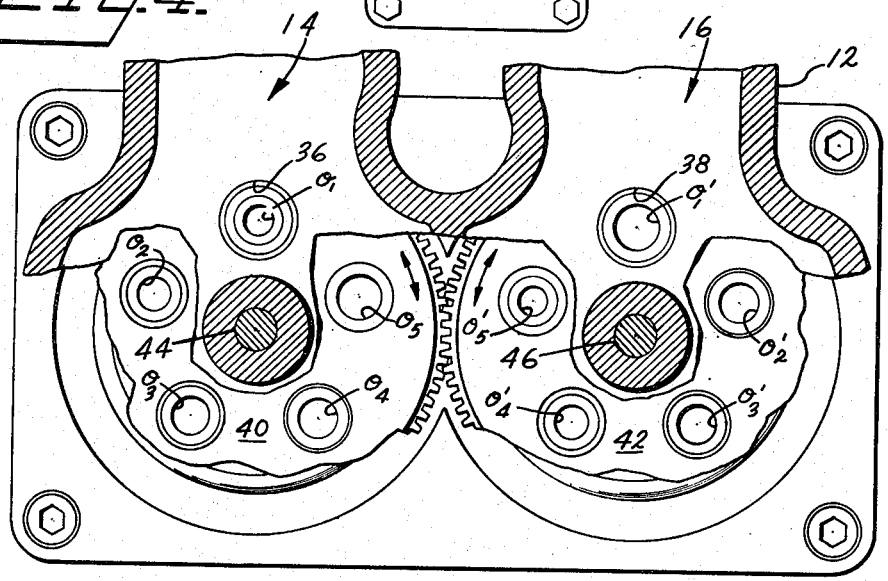

INVENTOR.
Gerhard G. Thiem
BY Chapin + Neal
Attorneys

May 11, 1965 G. G. THIEM 3,182,677
MIXING VALVE
Filed Oct. 5, 1962 4 Sheets-Sheet 4

INVENTOR.
Gerhard G. Thiem
BY Chapin & Neal
Attorneys

United States Patent Office 3,182,677
Patented May 11, 1965

3,182,677
MIXING VALVE
Gerhard G. Thiem, West Springfield, Mass., assignor to Gilbert & Barker Manufacturing Company, West Springfield, Mass., a corporation of Massachusetts
Filed Oct. 5, 1962, Ser. No. 228,718
10 Claims. (Cl. 137—100)

The present invention relates to improvements in delivering different liquids or grades of liquids in selected predetermined proportions.

One object of the invention is to provide a simple and efficient blending valve which will accurately deliver selected proportions of different liquids, particularly in the retail delivery of gasoline.

It has become common practice to provide three grades of gasoline in order to meet the octane requirements of the different automobiles which are on the market today. In order that it not be necessary to store three different grades of gasoline, the regular and premium grades are blended to provide an intermediate grade. The mixing valve of the present invention is particularly adapted to provide the necessary accuracy in the proportions of the two gasolines which are being blended.

A further object of the invention is to accomplish the above ends in a manner which permits the proportions of the different liquids to be varied in a simple manner which will not affect the accuracy of the desired proportions.

The need for changing the proportions of the liquids as applied to the gasoline dispensing art is found in the fact that where an intermediate grade is sold, it may be necessary to change the proportions of this intermediate grade from one season of the year to the next. Also, it may well be desirable to vary the octane rating of the intermediate grade as competition or price conditions might require. Further, the last specified object of the invention indicates the utility of the present mixing device where a single dispensing unit is employed to deliver both regular and premium grades of gasoline, as well as several selected intermediate grades.

The mixing valve construction of the present invention comprises first and second passageways for different liquids in combination with pressure balancing valve means at the inlet ends of these passageways for maintaining substantially equal pressures in the two passageways. The passageways have outlet openings and a pair of orifice plates overlying these openings. The orifices in the plates are of different sizes with the orifices in one plate having respectively corresponding orifices in the other plate. Each pair of corresponding orifices passes a predetermined different ratio of the two liquids through the outlet openings, and common means are provided for shifting the plates to bring a selected pair of corresponding orifices into register with the outlet openings. Each of the orifice plates may additionally have a further orifice which finds no corresponding orifice in the other plate so that when these additional orifices are brought into register with one of the outlet openings, the other outlet opening is sealed off for delivery of liquid from only one of the two passageways. Preferably, the orifices are "thin plate" orifices and the combined area of each pair of corresponding orifices is between .125 and .195 sq. in. It is also preferable that the orifice plates are rotatably mounted and simultaneously rotated by the common means for shifting the orifices into register with the outlet openings.

The above and other related objects and features of the invention will be apparent from a reading of the following description of the disclosure found in the accompanying drawings and the novelty thereof pointed out in the appended claims.

Figure 2:
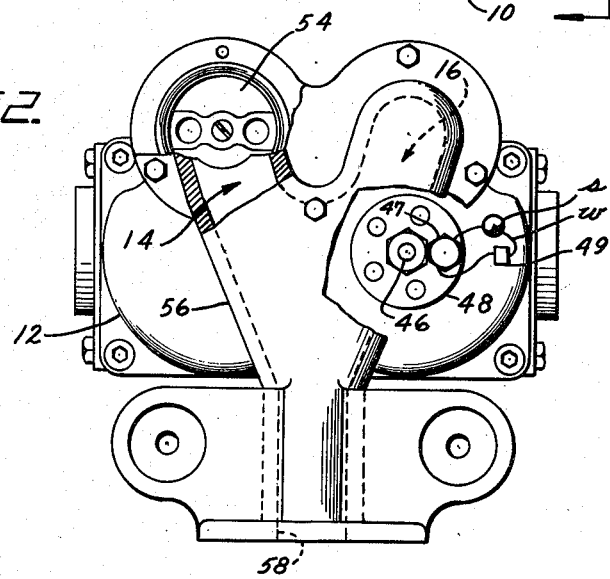
Figure 5:
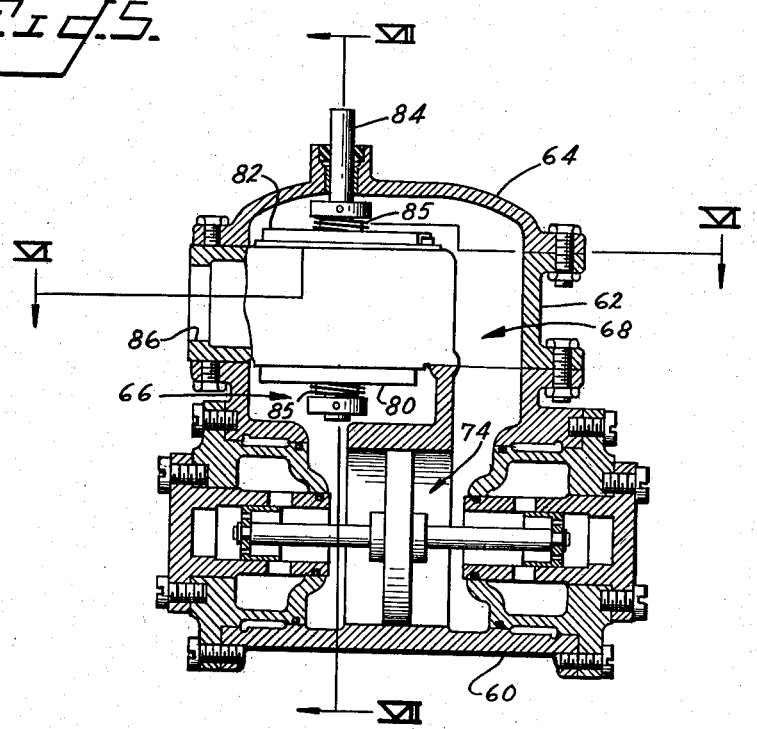
Figure 6:
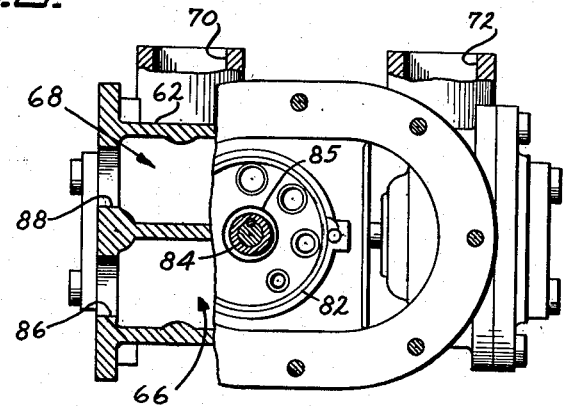
Figure 7:
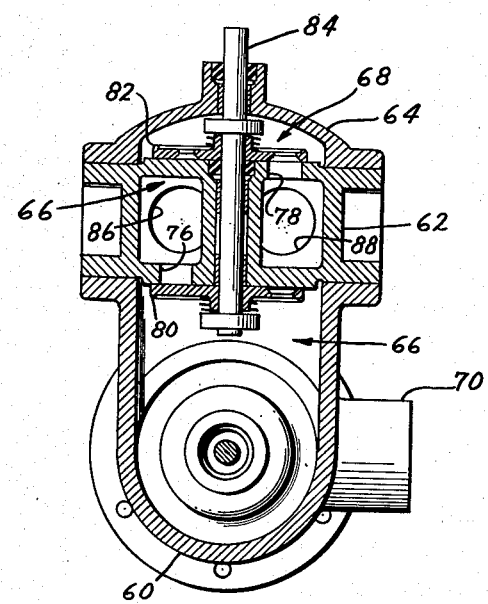
Figure 8:
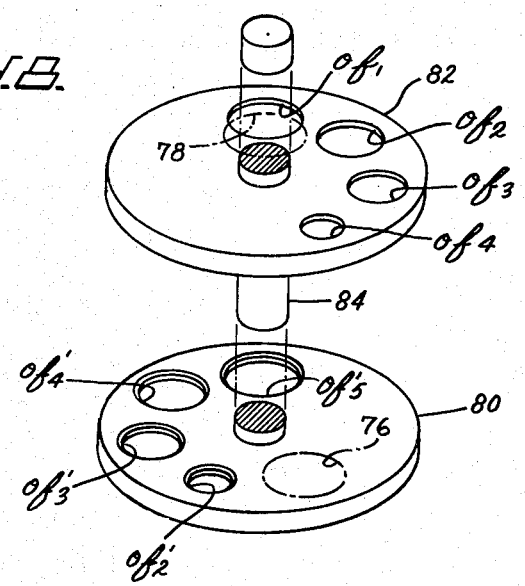

In the drawings:
FIG. 1 is an elevation, partly in section, of a mixing valve embodying the present invention;
FIG. 2 is a plan view of portions thereof broken away of this valve;
FIG. 3 is a section taken approximately on line III—III in FIG. 1;
FIG. 4 is a section, on an enlarged scale, taken generally on line IV—IV in FIG. 1;
FIG. 5 is an elevation showing in central section an alternate construction of the present valve;
FIG. 6 is a section taken generally on line VI—VI in FIG. 5;
FIG. 7 is a figure taken generally on line VII—VII in FIG. 5; and
FIG. 8 is a perspective view on an enlarged scale of the orifice plates seen in FIG. 5.

Referring first to the embodiment of FIGS. 1–4, and particularly FIG. 1 thereof, the present mixing valve construction comprises two housings 10 and 12 which compositely form first and second passageways, designated 14 and 16 respectively. Regular and premium gasolines, or like liquids, enter these passageways through inlets 18 and 20.

Flow of the liquids through the inlets 18 and 20 is controlled by pressure balancing valve 22. The valve 22 is, per se, of known construction and follows essentially the disclosure of Patent No. 1,985,918, Delancy. The pressure balancing valve comprises cylinders 24, each having a piston 26 riding therein. The positional relationship of the pistons 26 controls flow of liquid through openings 28 formed in the cylinders 24. The pistons 26 are secured to a rod 30 on which is mounted a larger piston 32. The piston 32 rides within a cylindrical portion 34 formed within the housing 10 and is subject, on its opposite sides, to the liquid pressures within the passageways 14 and 16. An increase in pressure in the passageway 14 will result in a displacement of the piston 32 towards the right, which would increase the rate of flow of liquid into the passageway 16, and decrease the flow of liquid into the passageway 14 until a condition of balance is arrived at wherein the pressure in the two passageways are equal or substantially so.

The passageways 14 and 16 are provided with outlet openings 36 and 38 respectively (FIGS. 3 and 4), formed in the lower surface of the housing 12. Orifice plates 40 and 42 respectively overlie the outlet openings 36 and 38. Suitable seals or packings are provided so that there is no leakage around the plates 40 and 42, and the orifices therein accurately control liquid flow through the outlet openings 36, 38. Orifice plate 40 is journaled on a shoulder screw 44 which is threaded into the housing 12. Orifice plate 42 is secured to a stem 46 which is journaled in the housing 12 and extends to the top thereof. A flanged nut 48 is secured to the upper end of the stem 46 to provide means for rotating the stem. The orifice plates 40 and 42 have meshing gear teeth formed in their peripheral edge faces so that rotation of the stem 46 will result in simultaneous rotation of both orifice plates.

The orifice plates 40 and 42 have a series of thin plate orifices identified $o_1$, $o_2$, $o_3$, $o_4$, $o_5$, and $o_1'$, $o_2'$, $o_3'$, $o_4'$ and $o_5'$, respectively, said orifices preferably being formed on a common radius about their centers of rotation. Each orifice in the plate 40 has a corresponding orifice in the plate 42 which is identified by like primed reference character and which is selected so that when one orifice of the plate 40 is in register with the outlet opening 36, the corresponding orifice in the plate 42 will be in register with the outlet opening 38. Thus, in the illustrated position of the plates 40 and 42, orifices $o_1$ and $o_1'$ give a ratio of the fluids passing through the outlet openings 36 and 38 of 30–70. Rotation of the plate 42 in a counterclockwise direction and resultant rotation of the plate 40 in a clockwise direction, would bring this ratio to 40–60 when the pair of corresponding orifices $o_2$ and $o_2'$ are brought into register with the discharge openings. Further rotation of these orifice plates in the same direction would progressively change the proportions of the liquids passing through outlets 36 and 38 to 50–50, 60–40, and 70–30 as the several pairs of corresponding orifices are brought into register with the outlet openings.

It is preferable that a series of openings be provided in the flange of nut 48 corresponding to positions wherein the pairs of orifices are in register with the outlet openings. The holes of the flange of nut 48 may be appropriately marked and a screw 47 threaded through a selected opening and into the housing 12 to maintain a given ratio of the two liquids. In order to prevent an unauthorized change in the ratio of the two liquids, sealing means are provided. These means comprise a lug 49 on the housing 12, a wire $w$ passes through the head of screw 47 and the lug 49. The ends of wire $w$ are joined by a lead seal or the like which will readily show if there has been any attempt to free the screw 47 for rotation.

It will also be noted that the combined area of each pair of corresponding orifices is a constant and equals approximately between .125 and .195 sq. in. with approximately .162 sq. in. being preferable. With this combined area of the orifices a constant, within the specified range, it has been found possible to obtain highly accurate proportions of the two liquids throughout the full range of delivery rates in a gasoline dispensing unit.

After the liquids have passed through the discharge openings 36 and 38, they pass through check valves 54 provided in continuations of the passageways 14 and 16 which are formed in the housing 12 and a third housing 56 secured thereto. As illustrated in FIG. 2, the passageways 14 and 16 are combined in a common discharge opening 58 in the housing 56.

As usually employed in a gasoline dispensing unit, the liquid discharged from the outlet 58 would pass through a meter and then to the dispensing nozzle for delivery to a customer. It is thus apparent that the present embodiment of the mixing valve would be employed in a dispensing unit for an intermediate grade of gasoline wherein the proportions of premium and regular are changed infrequently.

Reference is now made to FIGS. 5 through 8, and particularly FIG. 5 thereof. Housings 60, 62 and 64 compositely form first and second passageways 66 and 68 respectively. Regular and premium gasolines enter these passageways through lateral inlets 70 and 72. Flow of gasoline through the inlets is controlled by a pressure balancing valve 74, the construction of which is essentially the same as the valve 22 previously described, and the function of which is identical to that valve. The purpose being, again, to maintain equal pressures in the passageways 66 and 68. The outlet opening for the passageways 66 and 68 are found in the housing 62, being designated at 76 and 78 respectively in FIG. 7. Orifice plates 80 and 82 overlie these outlet openings and are secured to a common stem 84 which is journaled in the housings 62 and 64. The plates 80, 82 are maintained in sealing engagement with the housing 62 by springs 85.

A series of "thin plate" orifices are formed in the plates 80 and 82 on a common radius about their center of rotation and are designated $of_1$, $of_2$, $of_3$, $of_4$, and $of_2'$, $of_3'$, $of_4'$, and $of_5'$, respectively. There are three pairs of corresponding orifices in the plates 80 and 82, indicated by like reference characters differentiated only by a prime, and also an additional orifice $of_1$ and $of_5'$ in each plate which finds no corresponding orifice in the other plate. The relationship of these orifices may best be appreciated from FIG. 8. It will there be seen that the largest orifice, $of_1$, in the plate 82 is in register with the discharge opening 78, there being no corresponding orifice in plate 80, the discharge opening 76 is therefore sealed by that plate. Rotation of the stem 84 bringing the next largest orifice, $of_2$, into register with the outlet opening 78 will bring the smallest orifice, $of_2'$, of the plate 80 into register with the outlet 76. With this pair of orifices in register with the outlet openings, the liquids will pass through the outlets in a predetermined ratio of say 60–40. Rotation of the spindle to bring the next pair of orifices into register with the outlet also will result in a 50–50 ratio and then further rotation of the stem 84 to bring the last pair of orifices into register will result in a 40–60 ratio. the stem can then be rotated to bring the largest orifice $of_5'$, of the plate 80, into register with the outlet opening 76 which will result in delivery of liquid only through the outlet 76 inasmuch as there is no corresponding orifice in the plate 82 for the largest orifice in the plate 80.

In this alternate embodiment, the first and second passageways 66 and 68 have separate discharge outlets 86, 88 respectively, from the housing 62, so that as the liquids pass therefrom they may be maintained separate. The rates of flow through these passageways would be in a fixed predetermined ratio established by the position of the orifice plates 80, 82. The liquids from these two outlets may then pass through separate meters and maintained in separate conduits which are joined directly at a delivery nozzle. This would be the type of system employed in a gasoline dispensing unit where various blends or grades of gasoline are delivered selectively from a single dispensing unit and the selected grade may vary from delivery to delivery. The stem 84 to which the orifice plates 80 and 82 are secured would be connected to mechanism employed by the operator to establish the grade of gasoline to be delivered.

It will be apparent that either embodiment of the invention can be used in a so-called fixed blender or a variable blender dependent on the manner established for rotating the orifice plates. In either case accurate and reliable proportioning of the different grades of gasoline may be advantageously obtained.

Having thus described the invention, what is claimed as novel and desired to be secured by Letters Patent of the United States is:

1. A mixing valve construction for accurate delivery of preselected percentages of different liquids and comprising first and second passageways for different liquids, said passageways each having inlet and outlet openings in combination with pressure balancing valve means at the inlet ends of said passageways for maintaining substantially equal pressures in said passageways, a pair of orifice plates overlying said outlet openings in sealing engagement therewith, each plate having a plurality of orifice openings of different sizes, each orifice of one plate having an orifice corresponding to it in the other plate for delivery of liquid therewith, each pair of such corresponding orifices being arranged to pass a predetermined ratio of the two liquids through said outlet openings when brought into register therewith, and means for simultaneously shifting said plates to bring a selected pair of corresponding orifices into register with said outlet openings.

2. A mixing valve construction as in claim 1 wherein each plate has an additional orifice having no corresponding orifice for delivery therewith in the other plate, and the plates may be shifted to bring one or the other of said additional orifices into register with the appropriate outlet opening for delivery of only one of the liquids.

3. A mixing valve construction as in claim 1 wherein the orifices are "thin plate orifices" and the combined area of each pair of orifices is at least approximately equal to a constant.

4. A mixing valve construction as in claim 3 wherein the constant is between .125 and .195 square inch.

5. A mixing valve construction as in claim 4 wherein the constant is approximately .162 square inch.

6. A mixing valve construction as in claim 1 wherein the orifice plates are rotatably mounted, the orifices of each plate are concentrically arranged about the axis of rotation of said plate and further wherein the means for shifting said plates comprises means for simultaneously rotating them.

7. A mixing valve construction as in claim 6 wherein means are provided for locking the rotating means with the selected orifices in register with said outlet openings.

8. A mixing valve construction as in claim 7 wherein a wire is passed through said locking means and through a fixed point and means are provided to seal the ends of said wire to prevent unauthorized manipulation of said rotating means.

9. A mixing valve construction as in claim 6 wherein the outlet openings are formed in two opposed walls and the orifice plates are mounted on a spindle which comprises the shifting means.

10. A mixing valve construction as in claim 6 wherein the orifice plates are of circular outline and are disposed in side-by-side relation on a common plane and further wherein said plates have meshing gear teeth formed in their peripheral faces for the simultaneous rotation thereof.

References Cited by the Examiner

UNITED STATES PATENTS

| | | | |
|---|---|---|---|
| 906,783 | 12/08 | Du Brie | 137—607 X |
| 1,408,120 | 2/22 | Muk | 137—607 X |
| 1,780,589 | 11/30 | Hendrix | 137—607 X |
| 1,896,092 | 2/33 | Mangiameli | 137—607 X |
| 1,912,295 | 5/33 | Mintz | 137—607 |
| 1,985,918 | 1/35 | Delancy | 222—36 |
| 2,079,743 | 5/37 | Krieger | 137—607 X |
| 2,257,004 | 9/41 | Fleming | 137—607 X |
| 2,772,695 | 12/56 | Harrison | 137—607 X |
| 2,874,715 | 2/59 | Richards | 137—98 |
| 2,986,152 | 5/61 | Bayer | 137—99 |

ISADOR WEIL, *Primary Examiner.*

CLARENCE R. GORDON, *Examiner.*